(12) United States Patent
Mascarenhas et al.

(10) Patent No.: US 10,164,780 B2
(45) Date of Patent: Dec. 25, 2018

(54) SYSTEMS, METHODS, AND COMPUTER READABLE STORAGE DEVICE FOR DELIVERING POWER TO TOWER EQUIPMENT

(71) Applicant: AT&T Mobility II LLC, Atlanta, GA (US)

(72) Inventors: Patrick Mascarenhas, Atlanta, GA (US); Iftekhar Alam, Atlanta, GA (US); Ming-Ju Ho, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/893,134

(22) Filed: Feb. 9, 2018

(65) Prior Publication Data
US 2018/0167225 A1 Jun. 14, 2018

Related U.S. Application Data

(60) Continuation of application No. 15/617,148, filed on Jun. 8, 2017, now Pat. No. 9,929,867, which is a division of application No. 14/107,057, filed on Dec. 16, 2013, now Pat. No. 9,705,684.

(51) Int. Cl.
*H04L 12/10* (2006.01)

(52) U.S. Cl.
CPC ................................ *H04L 12/10* (2013.01)

(58) Field of Classification Search
CPC ........................................................ H04L 12/10
USPC ....................................................... 455/561
See application file for complete search history.

(56) References Cited

U.S. PATENT DOCUMENTS

| | | |
|---|---|---|
| 4,599,744 A | 7/1986 | Vaughan |
| 6,701,137 B1 | 3/2004 | Judd et al. |
| 6,752,657 B2 | 6/2004 | Gehrke et al. |
| 6,931,261 B2 | 8/2005 | Waylett et al. |
| 7,366,120 B2 | 4/2008 | Handforth et al. |
| 7,656,957 B2 | 2/2010 | Johnson et al. |

(Continued)

FOREIGN PATENT DOCUMENTS

| | | |
|---|---|---|
| CN | 101761263 | 6/2010 |
| CN | 101060412 | 5/2011 |

(Continued)

OTHER PUBLICATIONS

Hartung et al. "FixWxNet: A Multi-Tiered Portable Wireless System for Monitoring Weather Conditions in Wildland Fire Environments", MobiSys '06, pp. 28-40 {Jun. 2006}.

(Continued)

*Primary Examiner* — Raj Chakraborty
(74) *Attorney, Agent, or Firm* — Garlick & Markison; Bruce E. Stuckman

(57) ABSTRACT

A cell site includes a tower and a power over Ethernet system to power devices on the tower. The power over Ethernet system includes a power over Ethernet switch and a multiplexing box. Ethernet cables connect output ports of the power over Ethernet switch to input ports of the multiplexing box. A power plant is connected to the input of the power over Ethernet switch. Devices are connected to the output ports of the multiplexing box. The power over Ethernet system also includes a power management control.

20 Claims, 4 Drawing Sheets

(56) References Cited

U.S. PATENT DOCUMENTS

| | | | |
|---|---|---|---|
| 8,020,013 B2 | 9/2011 | Lin | |
| 8,164,205 B1 | 4/2012 | Bertz | |
| 8,594,854 B1* | 11/2013 | Tareen | H04L 12/10 |
| | | | 700/295 |
| 2003/0072055 A1 | 4/2003 | Mickelsson et al. | |
| 2004/0014466 A1 | 1/2004 | Jesse et al. | |
| 2004/0100941 A1* | 5/2004 | Lim | H04B 7/1858 |
| | | | 370/349 |
| 2006/0083186 A1 | 4/2006 | Handforth et al. | |
| 2008/0140565 A1 | 6/2008 | DeBenedetti et al. | |
| 2009/0076749 A1 | 3/2009 | Nasle | |
| 2011/0113269 A1 | 5/2011 | Park | |
| 2011/0140911 A1 | 6/2011 | Pant et al. | |
| 2012/0177021 A1 | 7/2012 | Shipman | |
| 2013/0083664 A1 | 4/2013 | Harris et al. | |
| 2013/0146355 A1 | 6/2013 | Strasser et al. | |
| 2013/0325197 A1 | 12/2013 | Mansfield | |

FOREIGN PATENT DOCUMENTS

| | | |
|---|---|---|
| WO | 2012170834 | 12/2012 |
| WO | 2006033097 | 3/2016 |

OTHER PUBLICATIONS

Ma et al. A 4-dBm High Voltage Broadband GaN Class-J Power Amplifier for PoE Micro-Basestations:, IEEE Intl Microwave Symposium, www.merl.com. 5 pp (Jun. 2013).

Watanabe et al. "Super-compact Base Station for Femtocells", NTT COCOMO Technical Journal10(2):64-68 (2008).

* cited by examiner

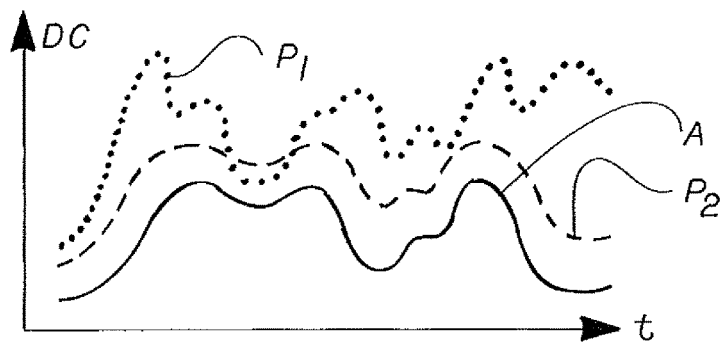
_Fig_4
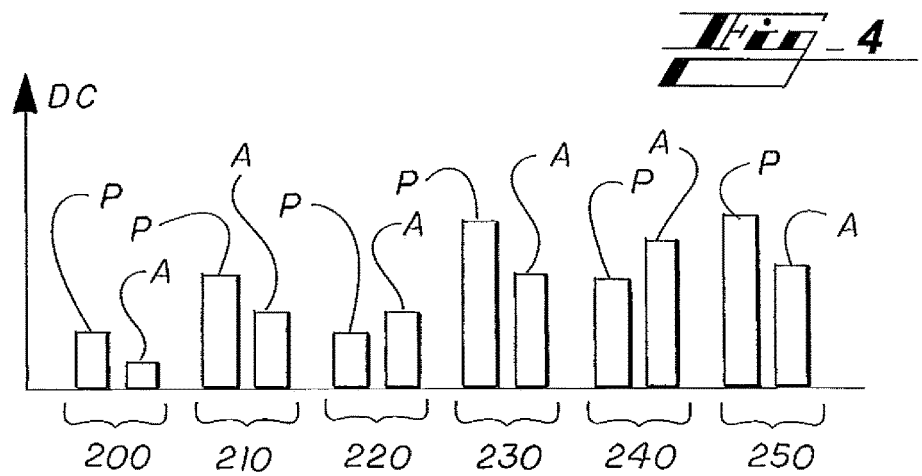
_Fig_5
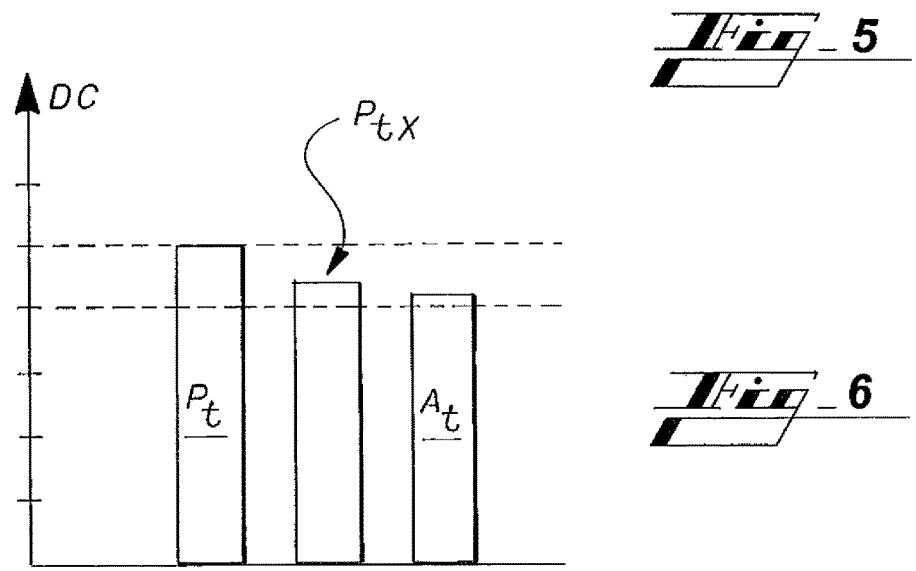
_Fig_6

SYSTEMS, METHODS, AND COMPUTER READABLE STORAGE DEVICE FOR DELIVERING POWER TO TOWER EQUIPMENT

CROSS REFERENCE TO RELATED APPLICATIONS

The present U.S. Utility Patent Application claims priority pursuant to 35 U.S.C. § 120 as a continuation of U.S. Utility application Ser. No. 15/617,148, entitled "SYSTEMS, METHODS, AND COMPUTER READABLE STORAGE DEVICE FOR DELIVERING POWER TO TOWER EQUIPMENT," filed Jun. 8, 2017, which is a divisional of U.S. Utility application Ser. No. 14/107,057, entitled "SYSTEMS, METHODS, AND COMPUTER READABLE STORAGE DEVICE FOR DELIVERING POWER TO TOWER EQUIPMENT", filed Dec. 16, 2013, now U.S. Pat. No. 9,705,684, all of which are hereby incorporated herein by reference in their entirety and made part of the present U.S. Utility Patent Application for all purposes.

TECHNICAL FIELD

The present disclosure relates generally to delivering power to tower equipment.

BACKGROUND

Equipment such as remote radio heads (RRHs) are installed at the top of cell towers. Each RRH requires direct current (DC) to power the RRH. To supply DC, a dedicated DC cable runs directly from the power plant on the ground to the RRH. In order to compensate for voltage drop, a bigger gauge of DC cable is used.

This type of installation is expensive. One reason is that the size and weight of DC cables may require to the tower structure to be modified. Another reason is that DC surge protection is required at tower top to protect against lightning strikes. In general, larger cables with higher current carrying capacity require a higher level of surge protection. Yet another reason is that the DC cables are made of copper, which is expensive because it is prone to theft. Copper theft is expensive not only because of the material and labor costs but also because of the cost of lost service due to a broken site. Lost service has large impacts on networks.

Cellular operators have been hit in the recent years with copper theft. Several towers are located in uninhabited areas and it is easy to extract copper from cables. Operators are responding by adding security gates/wires and by adding surveillance cameras.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrated embodiment, a system includes PoE (Power over Ethernet) or equivalent architecture. The PoE system lowers cable costs, surge protection costs, leasing costs, discourages theft, and facilitates trunking efficiency.

PoE cables have much thinner conductors and thus require low capacity, low cost surge protectors. Several smaller surge protectors are cheaper than one large high capacity surge protectors.

PoE cables discourage theft because they have thin copper and heavy PVC cladding, which makes for a very labor intensive process to extract copper.

Further, the PoE system provides trunking efficiency. Traffic is spread out in time and intensity between different sectors. The PoE system is configured to carry less than peak achievable load and to distribute the load over the sectors. The PoE system has a lower average power requirement at any given time period.

BRIEF DESCRIPTION OF THE DRAWINGS

FIG. 4 illustrates a graph of power consumption over time of a remote radio head of the cell site of FIG. 2, according to an illustrative embodiment.

FIG. 5 illustrates a bar graph of actual DC consumption and predicted DC consumption of remote radio heads of the cell site of FIG. 2, according to an illustrative embodiment.

FIG. 6 illustrates a bar graph of the total actual DC consumption and total predicted DC consumption associated with remote radio heads of the cell site of FIG. 2, according to an illustrative embodiment.

FIG. 7 illustrates a method for controlling power to a cell site according to an illustrative embodiment.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Illustrative embodiments are discussed with respect to delivering DC to power remote radio heads (RRHs). The teachings are applicable to delivering DC to power other devices including tower mounted amplifiers, integrated antennas (i.e., antenna with integrated radio unit), combinations thereat and the like. For example, excess DC at the top of the tower can be sold through leasing agreements to power devices that are not part of a wireless network or to other wireless networks.

Although the description that follows discusses a cell tower, the disclosure is not limited to this case. For example, the disclosure may also be applicable to water towers, other tall structures, and the like.

Figure 1:
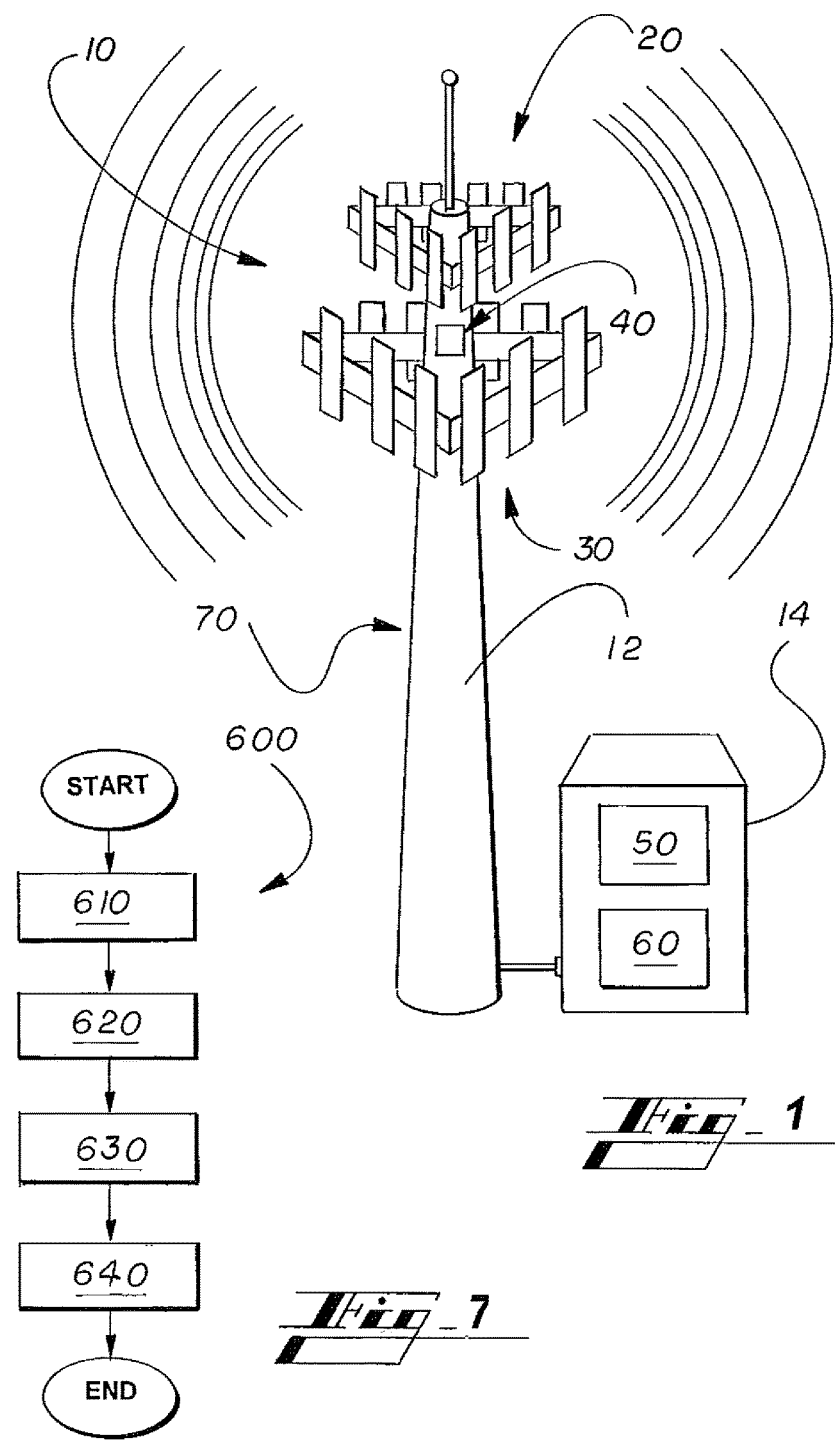
FIG. 1 illustrates a cell site according to an illustrative embodiment.

Cell Site FIG. 1

According to an illustrative embodiment, a cell site 10 includes a monopole cell tower 12 and a hatch plate 14 near the base of the tower 12. The tower 12 includes equipment near the top of the tower 12 including a first set of antennas 20, a second set of antennas 30, and a set of remote radio heads (RRH) 40 (also referred to as a remote radio units (RRU)). The hatch plate 14 includes a direct current (DC) power plant 50 (e.g., power supply) and a baseband unit (BBU) 60. In alternative illustrated embodiments, the hatch plate includes more than one BBU. A power over Ethernet (PoE) system 70 connects the power plant 50 to the set of RRHs 40, as described in further detail below.

Each of the first and second sets of antennas 20, 30 is positioned at or near the top of the tower 12. For example, the cell tower is 100-200 feet tall to vertically position the first and second sets of antennas 20, 30.

The first and second sets of antennas 20, 30 include subsets of antennas that are associated with a sector. For example, each of three subsets of antennas is associated with a one hundred twenty degree angle sector. A subset of antennas can include a single antenna or a group of antennas such as a group of two, a group of three, or a group of four. The illustrated first set of antennas 20 includes three antennas associated with each of three sectors and the illustrated second set of antennas 30 includes two antennas associated with each of three sectors.

Higher frequency antennas are generally shorter. For example, the antennas of the first set of antennas 20 support higher frequencies than the antennas of the second set of antennas 30.

Each of the antennas of the first set of antennas 20 and the second set of antennas 30 is configured to transmit and receive radio waves. For example, radio waves are transmitted to a handset (e.g., cell phone or mobile device) and are received from the handset.

The set of RRHs 40 and the BBU 60 provide a distributed radio system. Each of the set of RRHs 40 is configured to perform RF processing (e.g., analog radio functions) and the BBU 60 is configured to perform baseband processing (e.g., digital radio functions). The RRH includes RF circuitry, analog-to-digital/digital-to-analog converters, and up/down converters. The RRH is connected to the BBU via optical fiber.

Figure 2:
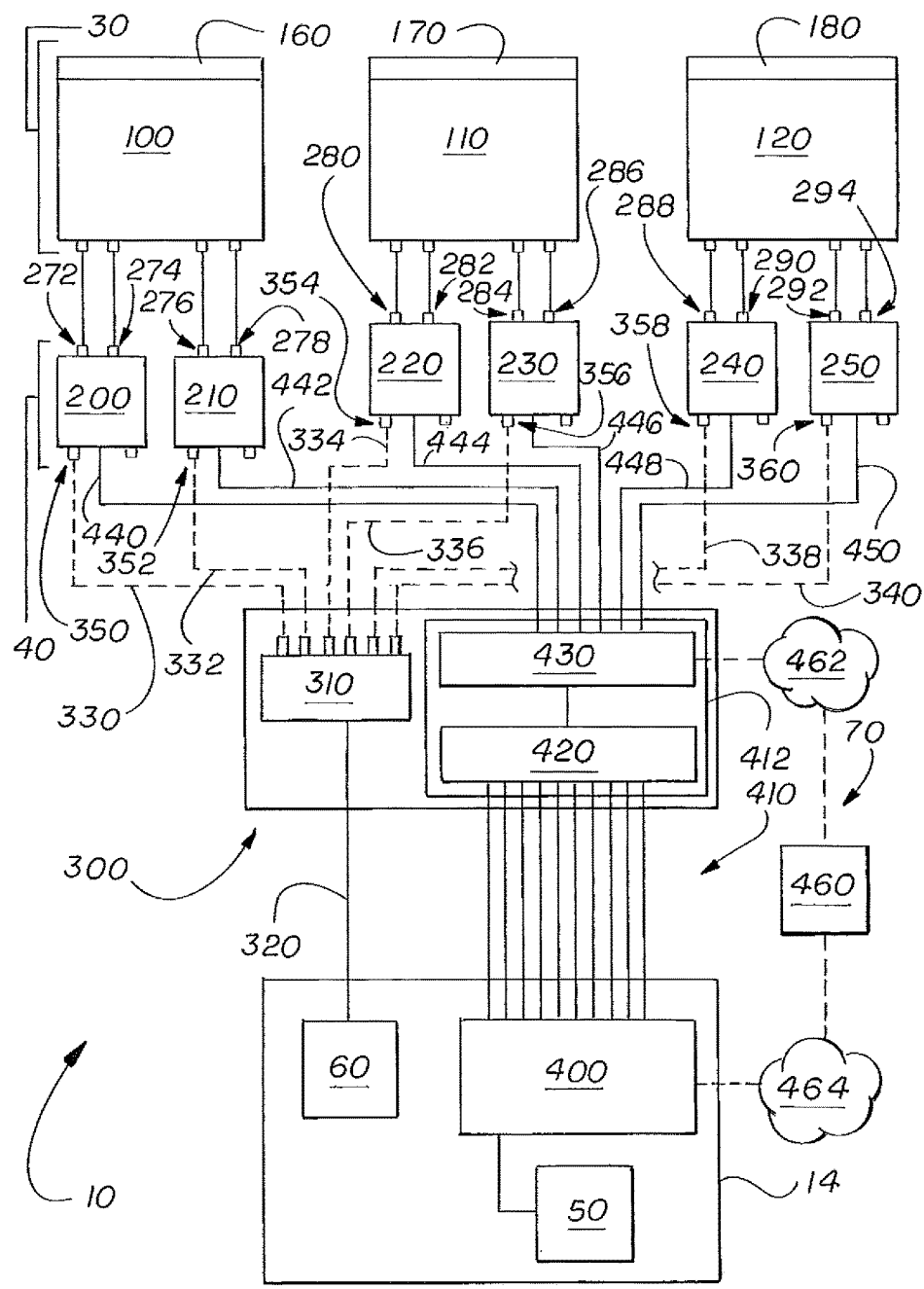
FIG. 2 illustrates a schematic of features of the cell site of FIG. 1.

Cell Site FIG. 2

Referring to FIG. 2, the cell site 10 is described in further detail with respect to certain of the set of RRHs 40 that are associated with and the second set of antennas 30.

Antennas

The second set of antennas 30 includes a first antenna subset 100, a second antenna subset 110, and a third antenna subset 120. For example, each antenna subset is associated with a different sector. The antenna subsets 100, 110, 120 can include various types of antennas including cross pollination antennas, vertical pollination antennas, horizontal pollination antennas, combinations thereof, and the like. For example, the antenna subsets 100, 110, 120 can include antennas that are perpendicular to one another and are aligned at a plus or minus forty five degree angle with respect to the vertical or horizontal plane.

Each of the antenna subsets 100, 110, 120 includes a remote electrical tilt (RET) unit 160, 170, 180 that is configured to adjust the tilt angle of a respective one of the antenna subsets 100, 110, 120. The antenna subsets 100, 110, 120 are tilted to aim a main lobe of the vertical plane radiation pattern of an antenna. For example, a remote electrical tilt (RET) unit includes RET motors that are configured to accurately tilt the antenna subsets. The RET motors are controlled from a controller, for example, in the hatch plate 14 or from a remote network management center (not shown).

RRHs

The set of RRHs 40 includes a first RRH 200, a second RRH 210, a third RRH 220, a fourth RRH 230, a fifth RRH 240, and a sixth RRH 250. Each RRH 200, 210, 220, 230, 240, 250 includes first and second transmit/receive ports (e.g., TX1/RX1, TX2/RX2).

The antenna subset 100 is connected to a first transmit/receive port 272 of the first RRH 200, a second transmit/receive port 274 of the first RRH 200, a first transmit/receive port 276 of the second RRH 210, and a second transmit/receive port 278 of the second RRH 210.

The antenna subset 110 is connected to a first transmit/receive port 280 of the third RRH 220, a second transmit/receive port 282 of the third RRH 220, a first transmit/receive port 284 of the fourth RRH 230, and a second transmit/receive port 286 of the fourth RRH 230.

The antenna subset 120 is connected to a first transmit/receive port 288 of the fifth RRH 240, a second transmit/receive port 290 of the fifth RRH 240, a first transmit/receive port 292 of the sixth RRH 250, and a second transmit/receive port 294 of the sixth RRH 250.

In alternative embodiments, an RRH is integrated into an antenna or antenna subset and the radio functionality is distributed across the antenna elements (e.g., an "active antennae").

Demarcation Box

The cell site 10 further includes a demarcation box 300. The demarcation box 300 includes a fiber management structure 310. A fiber trunk 320 connects the BBU 60 to the fiber management structure 310. Fiber cables run through the fiber trunk 320.

Fiber jumper cables 330, 332, 334, 336, 338, 340 run from the fiber management structure 310 to a respective one of the RRHs 200, 210, 220, 230, 240, 250. For example, the fiber jumper cables 330, 332, 334, 336, 338, 340 connect to a common public radio interface (CPRI) 350, 352, 354, 356, 358, 360 of a respective one of the RRHs 200, 210, 220, 230, 240, 250.

Power Over Ethernet

The PoE system 70 is configured to supply DC from the power plant 50 to the demarcation box 300, where it is then distributed to the RRHs 200, 210, 220, 230, 240, 250. Particularly, the PoE system 70 includes a PoE switch 400, Ethernet cables 410 (e.g., combined in a flat ribbon cable), a multiplexing box 412 including an aggregation box 420 and a distribution box 430, and a management control 460. The demarcation box 300 includes the multiplexing box 412.

DC jumper cables 440, 442, 444, 446, 448, 450 (e.g., each DC jumper cable includes a pair of cables) connect the distribution box 430 to the RRHs 200, 210, 220, 230, 240, 250. In alternative illustrated embodiments, a number of Ethernet cables connect the distribution box to the RRHs.

The power plant 50 is connected to an input of the PoE switch 400. Output ports of the PoE switch 400 are connected to input ports of the aggregation box 420 by the Ethernet cables 410 (e.g., RJ45 cables). For purposes of illustration, the PoE switch 400 includes N.sub.p(total) output ports and N.sub.c Ethernet cables 410 are connected to the output ports.

The output of the aggregation box 420 is the sum of the DC through the Ethernet cables 410 and is input to the distribution box 430. Output connections of the distribution box 430 are connected to DC input connections of the RRHs 200, 210, 220, 230, 240, 250 by the DC jumper cables 440, 442, 444, 446, 448, 450.

The power management control 460 is configured to control the distribution box 430 and the PoE switch 400. The illustrated power management control 460 is remotely connected to each of the distribution box 430 and the PoE switch 400 over interact connections 462, 464. Alternatively, the power management control 460 is directly connected to the distribution box 430 and the PoE switch 400. Although the location of the power management control 460 is illustrated as remote from the features of the cell site 10, the power management control 460 can be located at the cell site 10. For example, the power management control 460 can be located in the hatch plate 14, in the demarcation box 300, and the like. The power management control 460 may be implemented with a computing device, such as that illustrated in FIG. 3.

As described in further detail below, the power management control 460 is configured to adapt the number of open ports $N_p$(open) of the PoE switch 400 to the total predicted DC consumption $P_t$ of the RRHs 200, 210, 220, 230, 240, 250.

Figure 3:
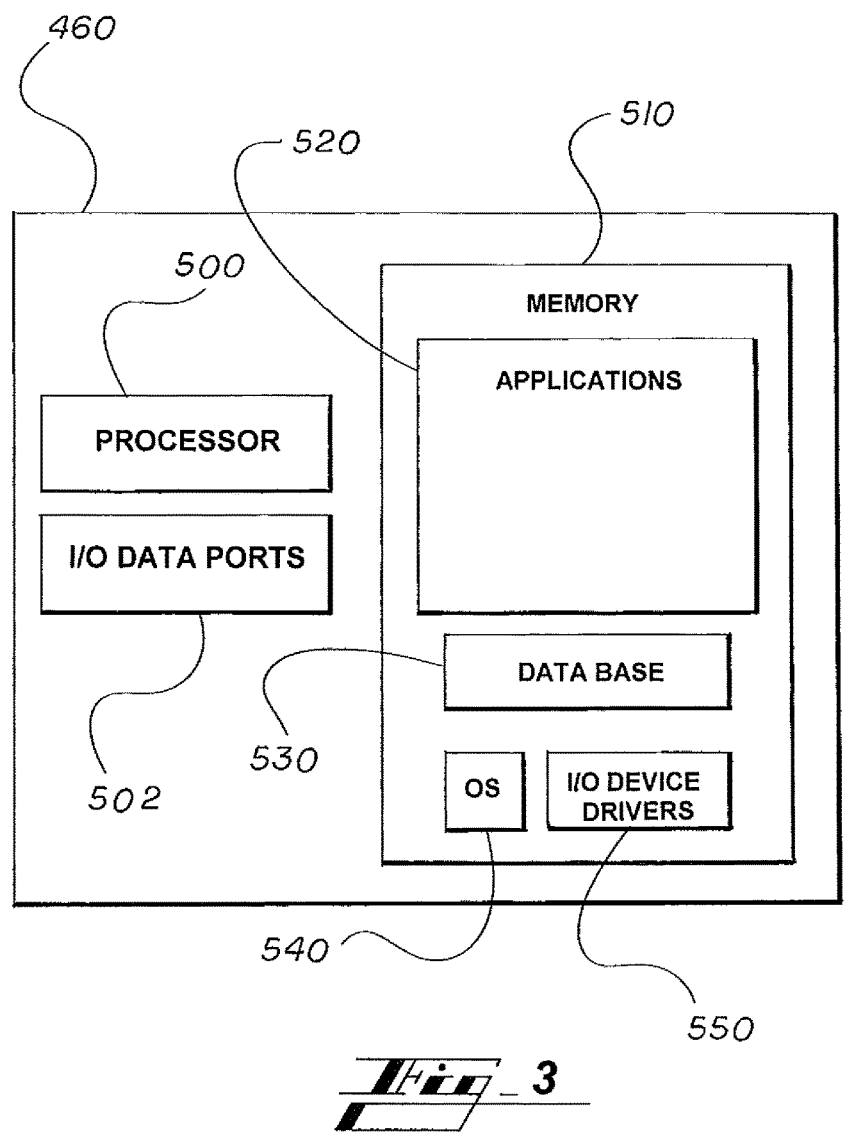
FIG. 3 illustrates a schematic of a computing device for controlling power to the cell site of FIG. 2 according to an illustrative embodiment.

Power Management Control FIG. 3

Referring to FIG. 3, the power management control 460 includes a computing device. The computing device includes a processor 500 for controlling and/or processing data, input/output (I/O) data ports 502, and a memory 510.

The processor can be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations", this could include the processor performing the operations directly and/or facilitating, directing, or cooperating with another device or component to perform the operations.

The computing device can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the computing device.

While the memory 510 is illustrated as residing proximate the processor 500, it should be understood that at least a portion of the memory can be a remotely accessed storage system, for example, a server on a communication network, a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 510 includes several categories of software and data used in the computing device, including, applications 520, a database 530, an operating system (OS) 540, and input/output (110) device drivers 550.

As will be appreciated by those skilled in the art, the OS 540 may be any operating system for use with a data processing system. The I/O device drivers 550 may include various routines accessed through the OS 540 by the applications to communicate with devices, and certain memory components. The applications 520 can be stored in the memory 510 and/or in a firmware (not shown) as executable instructions, and can be executed by the processor 500.

The applications 520 include various programs that, when executed by the processor 500, implement the various features of the power management control 460. The applications 520 include a power optimization application. The power optimization application includes computer readable instructions that, when executed by the processor 500, cause the processor 500 to perform operations for controlling power to a cell site as part of a control method 600 described in further detail below. The applications 520 are stored in the memory 510 and are configured to be executed by the processor 500.

The applications 520 may be applied to data stored in the database 530, such as the actual and predicted DC consumption of the RRHs along with data, e.g., received via the I/O data ports 502. The database 530 represents the static and dynamic data used by the applications 520, the OS 540, the I/O device drivers 550 and other software programs that may reside in the memory 510.

It should be understood that FIG. 3 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the computing device shown in FIG. 3.

While the description refers to computer-readable instructions, embodiments of the present disclosure also can be implemented in combination with other program modules and/or as a combination of hardware and software in addition to, or instead of, computer readable instructions.

The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

Traffic Load (Power Consumption) and Power Supply FIG. 4-6

Actual DC consumption A can be determined by measuring of one or more parameters including voltage, traffic load, power, and the like. For purposes of illustration, traffic load is described in further detail.

Traffic load varies over time and by sector. Actual DC consumption A of each RRH 200, 210, 220, 230, 240, 250 is based on the associated traffic load. For example, at a time when the traffic load is heavy in a sector, the RRH associated with that sector consumes more DC to support more active links. For example, FIG. 4 illustrates actual DC consumption A of an RRH 200, 210, 220, 230, 240, 250 over time. Measurements of actual DC consumption A over time can be used to calculated predicted DC consumption P, as described in further detail below.

Actual DC consumption A can be determined by measuring a traffic load and converting the traffic load to DC consumption. For example, a generally linear model can be used to convert traffic load to power consumption and then to DC consumption. The traffic load is measured, for example, by a network monitoring tool (not shown) and the network monitoring tool transfers the information to the power management control 460. Alternatively, for purposes of illustration, the power management control 460 is remotely or directly connected to each RRH 200, 210, 220, 230, 240, 250 to receive the traffic load or the DC consumption of each RRH 200, 210, 220, 230, 240, 250.

FIG. 5 illustrates, for each RRH 200, 210, 220, 230, 240, 250, predicted DC consumption P and actual DC consumption A at an instant in time. FIG. 6 illustrates the total predicted DC consumption $P_t$ and the total actual DC consumption $A_t$ by the RRHs 200, 210, 220, 230, 240, 250 at an instant in time.

The total predicted DC consumption $P_t$ for the RRHs 200, 210, 220, 230, 240, 250 is determined to exceed the total actual DC consumption $A_t$ by the RRHs 200, 210, 220, 230, 240, 250, for example, to provide a low probability of call blocking or call dropping. For example, referring to FIG. 5, the actual DC consumption A of the RRHs 200, 210, 220, 230, 240, 250 can be greater than the predicted DC consumption P of a respective one of the RRHs 200, 210, 220, 230, 240, 250 so long as, in aggregate, referring to FIG. 6, the total predicted DC consumption $P_t$ of the RRHs 200, 210, 220, 230, 240, 250 is greater than the total actual DC consumption A.sub.t of the RRHs 200, 210, 220, 230, 240, 250. The overprediction of the DC consumption of certain of the RRHs (e.g., RRHs 200, 210, 230, 250) can be used to compensate for the underprediction of the DC consumption of other of the RRHs (e.g., RRHs 220, 240). Calculation of the total predicted DC consumption $P_t$ is described in further detail below.

Method/Application FIG. 7

The power management control 460 is configured to adapt the number of open ports $N_p$ to the DC consumption of the RRHs 200, 210, 220, 230, 240, 250. In doing so, the power management control 460 is configured to minimize the DC to the RRHs 200, 210, 220, 230, 240, 250. For example, the power management control 460 minimizes the number of open ports N.sub.p of the PoE switch 400 based on actual total DC consumption $A_t$ or predicted total DC consumption $P_t$.

The power management control 460 includes, among the applications 520, a power optimization application. The power optimization application includes computer readable instructions that, when executed by the processor 500, cause the processor 500 to perform operations for controlling power to a cell site as part of a control method 600.

Referring to FIG. 7, according to a first step 610 of the method 600, the processor 500 accesses, receives, or calculates the predicted DC consumption P of each RRHs 200, 210, 220, 230, 240, 250 at a time t (e.g., see FIG. 5). Predicted DC consumption P can be determined using real-time or past data (e.g., statistically determined) of one or more parameters including voltage, traffic, power, and the like.

Referring to FIG. 4, according to some embodiments, predicted DC consumption P is a maximum measured DC consumption of an RRH at a recurring time t (see $P_1$ in FIG. 4). According to some embodiments, predicted DC consumption P is actual DC consumption A plus a factor of safety (see $P_2$ in FIG. 4). According to some embodiments, the predicted DC consumption P is the actual DC consumption A and the calculation is done in real time.

The total predicted DC consumption $P_t$ is equal to a number of open ports $N_p$(open) of the PoE switch 400 multiplied by the DC through each open port (e.g., as determined by the properties of the Ethernet cables 410). Referring to FIG. 6, the distance between adjacent hash marks on the y-axis represent the DC through output ports of the PoE switch 400.

According to a second step 620 of the method 600, to determine the total predicted DC consumption $P_t$, the processor 500 determines an approximated total predicted DC consumption $P_{tx}$. The approximated total DC consumption $P_{tx}$ is equal to the sum of the predicted DC consumption P for the RRHs 200, 210, 220, 230, 240, 250.

According to a third step 630 of the method 600, the processor 500 determines the total predicted DC consumption $P_t$ by calculating the minimum number of open ports $N_p$(open) of the PoE switch 400 that combine to provide DC that is greater than the approximated total predicted DC consumption $P_{tx}$. The total predicted DC consumption $P_t$ is the DC provided by the minimum number of open ports $N_p$(open) of the PoE switch 400.

According to a fourth step 640 of the method 600, the processor 500 generates a signal to set the status of the ports of the PoE switch 400 and the control sends the signal to the PoE switch 400 to implement the status of the ports.

It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a computer-readable medium.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   approximating, by a processor, a total predicted direct current consumption as a sum of a predicted direct current consumption of each of a plurality of remote radio heads;
   determining, by the processor and based on the approximating, a minimum number of open ports of a packet switch that combine to provide direct current power that is greater than the total predicted direct current consumption; and
   providing, via the packet switch, the direct current power to the plurality of remote radio heads in accordance with the minimum number.

2. The method of claim 1, further comprising:
   adapting, by the processor, a number of open ports of the packet switch to the total predicted direct current consumption of the plurality of remote radio heads.

3. The method of claim 1, wherein the predicted direct current consumption is determined using real-time or past data of one or more parameters including voltage, traffic, and power.

4. The method of claim 1, wherein the predicted direct current consumption of each of the plurality of remote radio heads includes at least one of:
   a maximum measured direct current consumption of one of the plurality of remote radio heads at a recurring time;
   an actual direct current consumption of one of the plurality of remote radio heads plus a factor of safety; and
   an actual direct current consumption of one of the plurality of remote radio heads.

5. The method of claim 1, wherein the packet switch is a power over Ethernet switch.

6. The method of claim 1, wherein the predicted direct current consumption includes a maximum measured direct current consumption of one of the plurality of remote radio heads at a recurring time.

7. The method of claim 1, wherein the predicted direct current consumption includes an actual direct current consumption of at least one of the plurality of remote radio heads plus a factor of safety.

8. The method of claim 1, wherein the predicted direct current consumption includes an actual direct current consumption of at least one of the plurality of remote radio heads.

9. The method of claim 1, further comprising generating, by the processor, a signal that is configured to set an open or closed status of ports of the packet switch, based on the total predicted direct current consumption of the plurality of remote radio heads.

10. The method of claim 9, further comprising sending, by the processor, the signal to the packet switch to implement an open or closed status of ports of the packet switch.

11. A computer-readable storage device having instructions stored thereon which, when executed by a processor, cause the processor to perform operations comprising:
   approximating a total predicted direct current consumption as a sum of a predicted direct current consumption of each of a plurality of remote radio heads; and
   determining, based on the approximating, a minimum number of open ports of a packet switch that combine to provide a direct current power that is greater than the total predicted direct current consumption;
   wherein the packet switch provides the direct current power to the plurality of remote radio heads in accordance with the minimum number.

12. The computer-readable storage device of claim 11, wherein the operations further comprise:
   adapting, by the processor, a number of open ports of the packet switch to the total approximated predicted direct current consumption of the plurality of remote radio heads.

13. The computer-readable storage device of claim 11, wherein the total predicted direct current consumption is determined using real-time or past data of one or more parameters including voltage, traffic, and power.

14. The computer-readable storage device of claim 11, wherein the packet switch is a power over Ethernet switch.

15. The computer-readable storage device of claim 11, wherein the total predicted direct current consumption includes a maximum measured direct current consumption of one of the plurality of remote radio heads at a recurring time.

16. The computer-readable storage device of claim 11, wherein the total predicted direct current consumption includes an actual direct current consumption of at least one of the plurality of remote radio heads plus a factor of safety.

17. The computer-readable storage device of claim 11, wherein the total predicted direct current consumption includes an actual direct current consumption of at least one of the plurality of remote radio heads.

18. The computer-readable storage device of claim 11, wherein the operations further comprise:
   generating a signal that is configured to set an open or closed status of ports of the packet switch, based on the total predicted direct current consumption of the plurality of remote radio heads.

19. The computer-readable storage device of claim 18, wherein the operations further comprise:
   sending the signal to the packet switch to implement an open or closed status of ports of the packet switch.

20. A method, comprising:
   approximating, by a processor, a total predicted direct current consumption as a sum of a predicted direct current consumption of each of a plurality of remote radio heads of a cell site; and
   determining, by the processor and based on the approximating, a minimum number of open ports of a packet switch associated with the cell site, wherein the number of open ports combine to provide direct current that is greater than the total predicted direct current consumption; and
   providing, via the packet switch, the direct current to the plurality of remote radio heads in accordance with the minimum number.

* * * * *